United States Patent
Meister et al.

(10) Patent No.: US 6,586,034 B2
(45) Date of Patent: Jul. 1, 2003

(54) COMPOSITION AND PROCESS FOR PRODUCING THICKENED COFFEE, TEA OR COCOA BEVERAGES

(75) Inventors: Jeffery D. Meister, Plymouth, MN (US); Donna Jean O'Connor, Maple Grove, MN (US)

(73) Assignee: Novartis Nutrition AG, Bern (CH)

( * ) Notice: Subject to any disclaimer, the term of this patent is extended or adjusted under 35 U.S.C. 154(b) by 0 days.

(21) Appl. No.: 10/007,033

(22) Filed: Dec. 6, 2001

(65) Prior Publication Data

US 2002/0086098 A1 Jul. 4, 2002

Related U.S. Application Data

(63) Continuation-in-part of application No. 09/552,373, filed on Apr. 19, 2000, now abandoned, which is a continuation-in-part of application No. 09/247,467, filed on Feb. 8, 1999, now Pat. No. 6,217,931.
(60) Provisional application No. 60/126,422, filed on Feb. 11, 1998, and provisional application No. 60/108,074, filed on Nov. 12, 1998.

(51) Int. Cl.$^7$ .................................................. A23F 5/00
(52) U.S. Cl. ....................... 426/593; 426/594; 426/596; 426/590; 426/658; 426/597
(58) Field of Search ................................. 426/594, 596, 426/590, 658, 593, 597

(56) References Cited

U.S. PATENT DOCUMENTS

| | | | |
|---|---|---|---|
| 4,156,020 A | * | 5/1979 | Bohrmann et al. |
| 6,217,931 B1 | * | 4/2001 | Meister |

* cited by examiner

*Primary Examiner*—Anthony J. Weier
(74) *Attorney, Agent, or Firm*—John W. Kung

(57) ABSTRACT

An improved thickened instant coffee beverage mix, comprising a mix of from about 15–90%, preferably 27%, maltodextrin with the rest, to 100%, of an agglomerated starch, and also 0.05–2.0% of mono- and di-glycerides or other wetting agents such as propylene glycol, glycerin, sorbitan monosterate and other emulsifiers, including 0.05–10.0% vegetable oils, together with coffee flavorants, which can be quickly dissolved in water of at least 120° F. water without delay or forming clumps; and an improved thickened instant tea or cocoa beverage mix which can be quickly dissolved in water of at least 120° F. water without delay or forming clumps, comprising 12–50% agglomerated starch as the thickening agent, together with sugar and protein components.

10 Claims, No Drawings

COMPOSITION AND PROCESS FOR PRODUCING THICKENED COFFEE, TEA OR COCOA BEVERAGES

RELATIONSHIP TO PRIOR APPLICATIONS

This application is a CIP of U.S. Ser. No. 09/552,373, filed Apr. 19, 2000, now abandoned, which in turn was a CIP of U.S. Ser. No. 09/247,467, filed Feb. 8, 1999, now U.S. Pat. No. 6,217,931, issued Apr. 17, 2001, which was a continuation of U.S. Ser. No. 09/022,195, filed Feb. 11,1998, now abandoned, the latter having been converted to Provisional application U.S. Ser. No. 60/126,422 filed Feb. 11, 1998 and also to Provisional application U.S. Ser. No. 60/108,074, filed Nov. 12, 1998.

FIELD OF INVENTION

The present invention relates generally to compositions which when mixed with hot water, yield thickened coffee, tea or cocoa beverages, and to the process for obtaining such compositions.

BACKGROUND OF THE INVENTION

Thickened beverages are used by patients in long term health care facilities and hospitals to address a swallowing condition known as dysphasia. It has been known that patients with swallowing problems are capable of handling thickened beverages. Because of the nature of this condition, it is important that the patient receive a product that is smooth textured and free of lumps. The degree of thickening needed is determined by the severity of the swallowing condition. Therefore, the beverage must also be consistent in terms of thickness from use to use. In recent years many new products have been introduced to address this need. These have included dry mixes, in which a starch is spooned into a liquid and mixed, as well as ready to serve thickened drinks. While the powered products have worked acceptably well in cold beverages, they have been unsuccessful in hot applications.

Currently, agglomerated pre-gelatinized starches are sold in the health care market for use as thickeners for beverages, either hot or cold beverages. Standard pre-gelatinized starches are generally difficult to mix into liquids. The process of agglomeration is a common technique used to improve the instantness of dry powders and mixes. The process involves, essentially, the sticking together of fine powder to form a bigger particle. In doing so, this product will have a lower bulk density and disperse more easily into liquids.

In the process of agglomerating, the powder is misted with a liquid as it is tumbled. In this way the particles are wetted and stick together. The environment in which this takes place is usually hot such that the agglomerate dries as it forms. In many cases, the powder is agglomerated using only water. However, solutions incorporating other ingredients, such as hydrophilic materials like sugars, dextrins, or cellulose, have also been used. Agglomerated starches have been successful as instant thickeners in cold beverage application but they have been met with only marginal success in hot applications. In hot liquids, the starch, even if agglomerated, tends to wet and begin hydrating before it has a chance to disperse. This leads to particles clumping together and forming lumps.

One method to counteract this lumping is to make a harder agglomerate by coating the starch with a carbohydrate based solution. This coating tends to slow down the hydration and allow the starch particles to disperse first. This essentially is the method described in U.S. Pat. No. 4,156,020 which relates to a process for producing a dry edible product having an admixture of starch and maltodextrin, which is made by mixing the maltodextrin with water, then mixing in the starch and conditioning, drying, then grinding to a desirable size. The resultant product, containing dry food ingredients, can be reconstituted with water without lumping. The drawback of this method when used to make thicken beverages for dysphasia patients is that slow hydration means that the liquid doesn't thicken quickly, and there is a tendency to add more starch powder than is needed. By the time the patient in the care facility receives the product, it may be too thick for their needs. In many cases the starch never fully hydrates. This partially hydrated starch may present an unacceptable mealy or granular texture.

PCT Application 91/118 517 relates to a process for the production of instant coffee powder, using a finely ground polysaccharide, such as maltodextrin in a mix with milled spray dried soluble coffee extract, and a small amount of finely ground roast coffee. This mix is reconstituted with hot water to give an instant coffee drink with the taste and aroma sensation of fresh coffee. However, this drink is not a thickened drink that is suitable to dysphasia patients.

U.S. Pat. No. 5,102,682 claims a food mix containing fructose, and a mixture of modified food starch with maltodextrin, with a defined moisture content. This product is not a thickened product.

U.S. Pat. No. 4,311,720 prepares a flavored food, or coffee product by mixing the flavor oil with an entrapped mixture of flavor oil in a starch or dextrin matrix. This food mix is not a thickened drink product.

In summary, the prior art provides food powders which when mixed with hot water, tend to lump. When and if the powders do disperse, they take too long to thicken and don't provide a smooth textured product.

SUMMARY OF THE INVENTION

The present invention comprises an improved thickened hot beverage drink mix, which can be quickly mixed into a thickened state to create the desired beverage drink, especially a hot coffee, tea or cocoa beverage. This has been accomplished by dispersing or diluting a starch, which is a quick hydrating agglomerated form, in a low bulk density maltodextrin matrix. With this composition, the mixture can easily disperse in the hot water, and the starch is prevented from clumping together by the presence of the maltodextrin particles which act to separate the starch granules. The maltodextrin then dissolves leaving the starch particles separated and free to hydrate without clumping. In this invention there is also added a thin layer of mono and diglycerides to the starch/maltodextrin composition. Although this invention should not be bound by theory, this ingredient is believed to help adhere the starch and maltodextrin together and to prevent separation and stratification of these components due to particle size and density differences. This is particularly important during handling and storage of the food product. By the prevention of this separation, each sample of food product has the same ratio of starch and maltodextrin, as well as flavorants and colorants. This helps to ensure a consistent product to the end user with each use.

The principal object of the invention is to provide an instant thickened coffee, tea or cocoa beverage mix which can be easily and quickly prepared by blending with hot water without clumping.

Another object is to provide the process for producing the instant thickened coffee, tea or cocoa beverage characterized by quick hydration and thickening without lumping or clumping.

Other objects and advantages of the invention will become apparent in the description and examples hereinafter appearing.

DETAILED DESCRIPTION OF THE INVENTION

Beverages designed for dysphasia patients are usually classified into three consistencies, known as "nectar", "honey", and "pudding". This classification is rather loosely adhered to. Each manufacturer or facility applies its own standard to these consistencies. What compounds this confusion is the fact that most of the thickened liquid products, because of their nature, have slightly different flow properties. Thickened juices flow different than thickened milk. While there is no objective industry standard for distinguishing these consistencies, this invention provides a guideline by which to distinguish each consistency.

Even though flow properties are different, a viscosity measurement can be used to characterize different thickened liquid products. This invention measures viscosity by using a Brookfield viscometer (Model LVT), which measures the resistance generated by rotating a standard spindle through the product. The viscosities which have been established for a given consistency should fall into the following ranges: Nectar, 500–1400 centipoise as measured with a number 3 spindle at 60 rpm (cps); Honey, 1800–3500 cps. As measured with a No. 3 spindle at 30 rpm; and pudding, >5000 cps. as measured with a No. 3 spindle at 12 rpm. These were determined at the serving temperature of the product, 140–150° F.

The process for producing the hot coffee, tea or cocoa thickened beverage which is readily dispersible in hot water utilizes a pre-gelatinized starch, which is in a quick hydrating agglomerated form, mixed in a low bulk density maltodextrin matrix. For the preparation of tea and cocoa beverages, the maltodextrin component can be omitted, as the added sugar for those beverages makes its presence unnecessary.

The agglomerated starches used in the process of this invention have good overall thickening qualities, and which provide the type of flavor, mouthfeel and consistency desired in the final finished coffee, tea or cocoa beverage product. Most agglomerated starches can be used. As noted above, most unagglomerated starches do not perform well even within the maltodextrin matrix. But if certain finished product attributes are compromised, some unagglomerated starches could also be suitable for use. The optimal starch should be free flowing and have an average particle size greater than 100 micrometers. Its bulk density (loose packed) should be in the range of 5–25 lbs/ft$^3$. Most desirable products tested include the following commercially available starch products:

C☆Tex-instant Starch—Cerestar

Mirasperse®Starch series—A.E. Staley Manufacturing Co.

Ultrasperse® Starch series—National Starch Corp.

Instant Pure Flo® Starch—National Starch Corp. (unagglomerated)

For coffee beverages and compositions, the total amount of starch employed is from 10–85%, based on the total weight of the starch/maltodextrin blend, and preferably 60–80%, even more preferably 70–80%, most preferably 72–75%, still more preferably 73%. For the preparation of tea and cocoa beverages, the final beverage mixture contains sugars and/or protein solids, so the presence of the maltodextrin is not necessary, and can be omitted. Both the sugar and the protein components contribute to the mixability properties of the final composition. In addition, lower amounts of starch can be employed, from 10–80%, preferably 15–50%, based on the weight of the final mixture. Suitable sugars include, beet sugar, cane sugar, sucrose, fructose, corn syrup and the like, or combinations thereof.

The type of maltodextrin is also important to this invention. A maltodextrin that is free flowing, with a bulk density of less than 30 lbs/ft$^3$ is the most desirable. For densities greater than 15 lbs/ft$^3$, the maltodextrin should be of a granular form as opposed to a fine powder. To achieve the low bulk densities of less than 10 lbs/ft$^3$ the maltodextrin may be in an agglomerated form also. The tested products include the following:

| | |
|---|---|
| C☆Dry MD 01996; Cerestar | Acceptable 8 lbs/ft$^3$ |
| N-Zorbit M; National Starch | Preferred 6 lbs/ft$^3$ |
| M-700 Maltodextrin; Grain Processing Corp. | Acceptable 7 lbs/ft$^3$ |
| M-510 Maltodextrin; Grain Processing Corp. | Acceptable 30 lbs/ft$^3$, granular |
| M100 Maltodextrin; Grain Processing Corp. | Unacceptable 35 lbs/ft$^3$ fine powder |
| Lodex 10 Maltodextrin; Amaizo (Cerestar) | Unacceptable 35 lbs/ft$^3$ fine powder |

The preferred maltodextrin was selected because it tended to be slower in wetting and therefore slowed down the dispersing and dissolving of the finished product slightly, which provides an advantage in terms of tolerance to different methods of mixing that may be practiced. The other acceptable maltodextrins wetted more quickly, but they also prevented lumping in the same manner as the preferred.

The amount of starch to maltodextrin is an important part of this invention. A minimum of about 15% maltodextrin is required to adequately dilute the starch. The maximum can be up to about 90%. However, it is felt that this high level would not be practical or economical. The range of useful amount of maltodextrin is determined by the final viscosity of the thickened hot coffee, tea or cocoa beverage. Generally, about 20–35% is preferred, with the best use level for the components of this invention being about 25–28%, most preferable 27% maltodextrin, all amounts based on starch being the rest of the matrix to a total of 100%. For tea, an amount of about 20–25% is preferred, with the most preferred level about 30–32%.

The cocoa beverage has some components that are uniquely useful in the final beverage, such as protein solids, whey, nonfat dry milk, and non-dairy creamers. Their presence means that the maltodextrin can be omitted, as the potential agglomerating properties of the mixture are significantly changed. When the starch component is used alone in the cocoa mixture, it is employed at between about 12–25%, preferably 15–19%, and most preferably 16–18%, based on the weight of all components in the final composition.

The starch and the maltodextrin are mixed together, preferably in dry form. These are blended in any suitable blending equipment, such as a ribbon blender or planetary mixer. The blending is complete when the proper homogeneity is reached, as determined by use of sampling techniques known in the art. Over-mixing is to be avoided in that it may damage the structure of the starch and maltodextrin components.

The coffee, either caffeinated, or non-caffeinated is added to the blend of starch and maltodextrin after the latter has been formed, in a preferable embodiment of this invention. The coffee, tea or cocoa can also be blended with the starch or the maltodextrin separately, or with one or the other alone and then the starch/maltodextrin blend prepared as above. It was found that flavorants in an instant granular form worked better than those in a fine powder form. Flavorants are added to taste. In the case of the present invention, the instant coffee, tea or cocoa was added at a level of 1 part to 9 parts starch/maltodextrin blend. Colorants may also be added. Other flavorants could be used to provide other flavored applications to this invention, such as teas or cocoas.

Small amounts of a non-aqueous processing aid are added by spraying onto the blended mixture in the suitable equipment using an atomized sprayer to improve the processibility of the final product. The amounts of the processing aid can be from 0.05–2.0 weight percent, based on the total weight of the composition, when the processing aid is at least one mono- or di-glyceride, propylene glycol, glycerin, sorbitan monosterate or other similar emulsifiers. Vegetable oils can also be used in the amount of about 0.05–10.0 weight percent, based on the total weight of the composition for this purpose.

This component can also be pre-blended or plated onto a small amount of the blended product or any of its components and then incorporated into the whole with proper mixing. The preferred component for this is mono- and di-acylglycerols (mono- and di-glycerides). Other processing aids and wetting agents that proved acceptable included propylene glycol, glycerin, sorbitan monosterate, vegetable oils and other emulsifiers.

In general there are many suitable processing aids and wetting agents that can be used with this invention. Examples can be selected from the group consisting of: stearyl-n-lactylic acids, where n ranges from about 1 to 5, and the sodium, potassium and calcium salts thereof, succinylated mono- and di-glycerides of edible $C_{12}$–$C_{24}$ fatty acids and the sodium and potassium salts thereof, diacetyl tartaric acid esters of mono- and di-glycerides of $C_{12}$–$C_{24}$ edible fatty acids, and the sodium and potassium salts thereof, polyglycerol esters of $C_{12}$–$C_{24}$ edible fatty acids, ranging from 3 to 10 glycerol units and one to ten fatty acids per molecule, polyoxyethylene (20) sorbitan mono-, di- and tri-esters of $C_{12}$–$C_{24}$ edible fatty acids, ethoxylated mono- and di-glycerides of edible $C_{12}$–$C_{24}$ fatty acids, stearyl monoglyceridyl citrate, and the sodium and potassium salts thereof, citric acid esters of mono- and di-glycerides of edible $C_{12}$–$C_{24}$ fatty acids, and the sodium and potassium salts thereof, propylene glycol mono- and di-esters of edible $C_{12}$–$C_{24}$ fatty acids, glycerol mono- and di-esters of edible $C_{12}$–$C_{24}$ fatty acids, lactylated propylene glycol and glycerol mono- and di-esters of edible $C_{12}$–$C_{24}$ fatty acids, acetylated propylene glycol and glycerol mono- and di-esters of edible $C_{12}$–$C_{24}$ fatty acids, sorbitan monostearate, lecithin, sucrose esters of edible $C_{12}$–$C_{24}$ fatty acids, phosphated mono- and di-glycerides of edible $C_{12}$–$C_{24}$ fatty acids, and mixtures thereof.

The final product is then packaged into appropriate container or package.

The final product has moisture content of less than 5% to maintain free flowing and a loose bulk density in the range of 5–25 lbs/ft$^3$.

For the final product, the powdered coffee blend is used to prepare the beverage by mixing about 5–20 g of the powder with about 6–8 oz of hot water, which is at a temperature of 120–190° F., and preferably 160–170° F., and stirring until dissolved. The desired viscosity or consistency of the product will be determined by the amount of the starch used. This will, also, depend on the mix ratio of the components. The tea or cocoa blends require higher levels of the powder dry mixes to prepare the beverage, usually about 10–40 g of the powder to the 6–8 oz hot water.

The following examples will serve to more fully illustrate the present invention.

EXAMPLE 1

Combine, into a suitable mixer, 73 lbs of agglomerated starch with 27 lbs of low bulk density maltodextrin. Mix for five minutes. While mixing spray 0.24 lbs of mono- and di-acylglycerols. Stop mixer and add 15 lbs of instant spray dried coffee. Mix an additional five minutes. Portion product into desired amount to achieve the desired consistency. To achieve finished product, mix portion into 177 mL of hot water.

EXAMPLE 2

Combine, into a suitable mixer, 73 lbs of agglomerated starch (Mirasperse 629) with 27 lbs of low bulk density maltodextrin (N-Zorbit M or Maltrin M700). Mix for five minutes. While mixing spray 0.24 lbs of mono- and di-acylglycerols. Stop mixer and add 15 lbs of instant spray dried coffee. Mix an additional five minutes. Portion product into desired amount (10.8 g for nectar consistency and 12.5 g for honey consistency). To achieve finished product, mix portion into 177 mL of 120–190° F. water.

EXAMPLE 3

Combine, into a suitable mixer, 73 lbs of agglomerated starch (Mirasperse 629) with 27 lbs of low bulk density maltodextrin (N-Zorbit M or Maltrin M700). Mix for five minutes. While mixing spray 0.24 lbs of sorbitan monostearate (Polysorbate 80). Stop mixer and add 15 lbs of instant spray dried coffee. Mix an additional five minutes. Portion product into desired amount (10.8 g for nectar consistency and 12.5 g for honey consistency). To achieve finished product, mix portion into 177 mL of 120–190° F. water.

EXAMPLE 4

Combine, into a suitable mixer, 27 lbs of low-density maltodextrin (N-Zorbit M or Maltrin M700) with 15 lbs of instant spray dried coffee. Mix for five minutes. While mixing spray 0.24 lbs of mono- and di-acylglycerols. Stop mixer and add 73 lbs of agglomerated starch (Mirasperse 629) with. Mix an additional five minutes. Portion product into desired amount (10.8 g for nectar consistency and 12.5 g for honey consistency). To achieve finished product, mix portion into 177 mL of 120–190° F. water.

EXAMPLE 5

Weigh out 10 lbs of low-density maltodextrin into mixing apparatus. Add 0.24 lbs of mono- di-acylglycerols and blend for 15 minutes. Combine this mixture with 73 lbs agglomerated starch (Mirasperse 629), 17 lbs of low-density maltodextrin (N-Zorbit M or Maltrin M700), and 15 lbs of instant spray dried coffee. Mix for five minutes. Portion product into desired amount (10.8 g for nectar consistency and 12.5 g for honey consistency). To achieve finished product, mix portion into 177 mL of 120–190° F. water.

EXAMPLE 6

Combine, into a suitable mixer, 57 lbs of agglomerated starch (Mirasperse 629) with 43 lbs of a fine granular maltodextrin (Maltrin M510). Mix for five minutes. While mixing spray 0.24 lbs of mono- and di-acylglycerols. Stop mixer and add 15 lbs of instant spray dried coffee. Mix an additional five minutes. Portion product into desired amount (13.8 g for nectar consistency and 16.0 g for honey consistency). To achieve finished product, mix portion into 177 mL of 120–190° F. water.

EXAMPLE 7

Thickened Hot Tea, Nectar and Honey Consistencies

| Ingredient Description | Quantities | Percents |
|---|---|---|
| Starch, agglomerated Instant | 230.8 lbs | 46.16 |
| Maltodextrin low bulk density | 109.3 lbs | 21.85 |
| Sugar, beet | 103.7 lbs | 20.75 |
| Tea, instant | 50.6 lbs | 10.13 |
| Flavor, lemon | 4.9 lbs | 0.97 |
| Mono- & di-glycerides | 0.7 lbs | 0.15 |
| Total | 500.0 lbs | 100.0% |

EXAMPLE 8

Thickened Hot Cocoa, Nectar and Honey Consistencies

| Ingredient Description | Quantities | Percents |
|---|---|---|
| Sugar, beet | 509.5 lbs | 56.61 |
| Starch, agglomerated, instant | 152.6 lbs | 16.96 |
| Whey, dry | 86.4 lbs | 9.60 |
| Cocoa Powder | 77.0 lbs | 8.55 |
| Creamer, non-dairy | 61.7 lbs | 6.85 |
| Nonfat Dry Milk | 6.3 lbs | 0.71 |
| Salt | 4.5 lbs | 0.50 |
| Flavor, vanilla | 2.0 lbs | 0.22 |
| Total | 900.0 lbs | 100.0% |

What is claimed is:

1. A composition for mixing with water at a temperature of at least 120° F. to form a thickened coffee, tea or cocoa beverage, said composition comprising:

(a) 15–90 weight percent, based on the total weight of the composition, of free flowing maltodextrin having a bulk density of less than or equal to 30 lbs/ft$^3$;

(b) pre-gelatinized starch; and (c) coffee, tea, or cocoa flavorant, respectively;

(d) and an effective amount of a non-aqueous processing aid.

2. The composition according to claim 1 wherein the non-aqueous processing aid is at least one mono- or di-glyceride, propylene glycol, glycerin, sorbitan monostearate or other emulsifier, and is present at about 0.05–2.0 weight percent, based on the total weight of the composition.

3. The composition according to claim 1 wherein the non-aqueous processing aid is vegetable oils and is present at about 0.05–10.0 weight percent, based on the total weight of the composition.

4. The composition according to claim 1 wherein the maltodextrin is present in an amount of from 20–30 weight percent.

5. The composition according to claim 4 wherein the maltodextrin is present in an amount of from 25–28 weight percent.

6. The composition according to claim 1 wherein the maltodextrin has a bulk density of 5–13 lbs/ft$^3$.

7. The composition according to claim 6 wherein the maltodextrin has a bulk density of 6 lbs/ft$^3$.

8. The composition according to claim 1 wherein the pregelatinized starch is agglomerated.

9. The composition according to claim 8 wherein the pregelatinized starch has an average particle size greater than 100 micrometers.

10. The composition according to claim 1 which has a moisture content of up to 5 weight percent.

* * * * *